United States Patent
Kobayashi

(10) Patent No.: US 10,407,038 B2
(45) Date of Patent: Sep. 10, 2019

(54) HYDRAULIC PRESSURE GENERATING APPARATUS

(71) Applicant: NISSIN KOGYO CO., LTD., Ueda, Nagano (JP)

(72) Inventor: Nobuyuki Kobayashi, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/560,286

(22) Filed: Dec. 4, 2014

(65) Prior Publication Data

US 2015/0166030 A1   Jun. 18, 2015

(30) Foreign Application Priority Data

Dec. 12, 2013   (JP) ................................. 2013-257216

(51) Int. Cl.
    *B60T 13/58*   (2006.01)
    *B60T 8/36*    (2006.01)
    (Continued)

(52) U.S. Cl.
    CPC .............. *B60T 13/58* (2013.01); *B60T 8/368* (2013.01); *B60T 13/686* (2013.01); *B60T 7/042* (2013.01); *B60T 8/4081* (2013.01); *B60T 2220/04* (2013.01)

(58) Field of Classification Search
    CPC .. B60T 13/686; B60T 8/4081; B60T 2220/04; B60T 8/328; B60T 8/3675; B60T 8/4086; B60T 8/409
    (Continued)

(56) References Cited

U.S. PATENT DOCUMENTS

| 5,395,164 A * | 3/1995 | Sulzyc .................... B60T 7/042 188/151 A |
| 2009/0179485 A1* | 7/2009 | Yang ....................... B60T 7/042 303/20 |

(Continued)

FOREIGN PATENT DOCUMENTS

| CN | 1789050 | 6/2006 |
| CN | 103209872 | 7/2013 |

(Continued)

OTHER PUBLICATIONS

European Search Report for the related EP application No. 14197147.3-1756, dated Apr. 15, 2015, 8 pages.

(Continued)

*Primary Examiner* — Bradley T King
*Assistant Examiner* — Mahbubur Rashid
(74) *Attorney, Agent, or Firm* — Andrew M. Calderon; Roberts Mlotkowski Safran Cole & Calderon, P.C.

(57) ABSTRACT

One embodiment provides a hydraulic pressure generating apparatus including: a base body; a master cylinder; and a stroke sensor, wherein a rear surface of the base body faces a brake operator, a bottomed-cylindrical-shaped first cylinder bore accommodating a first piston of the master cylinder is opened to the rear surface of the base body, and an input member connected to the brake operator is inserted in the first cylinder bore. The stroke sensor, plural solenoid valves and a control unit are attached to one surface of the base body, such that the stroke sensor and the solenoid valves are accommodated within a housing of the control unit. On the one surface, the stroke sensor is disposed adjacent to the rear surface of the base body, and the solenoid valves are disposed adjacent to a front surface of the base body.

20 Claims, 6 Drawing Sheets

(51) Int. Cl.
*B60T 13/68* (2006.01)
*B60T 7/04* (2006.01)
*B60T 8/40* (2006.01)

(58) Field of Classification Search
USPC .............................. 303/14; 188/151 A, 156
See application file for complete search history.

(56) References Cited

U.S. PATENT DOCUMENTS

| | | | |
|---|---|---|---|
| 2009/0195060 A1* | 8/2009 | Nishikawa | B60T 8/3225 303/116.1 |
| 2012/0118682 A1* | 5/2012 | Murayama | B60T 13/166 188/152 |
| 2012/0119566 A1* | 5/2012 | Ohnishi | B60T 7/042 303/20 |
| 2012/0298897 A1* | 11/2012 | Nakamura | B60T 8/3675 251/129.15 |
| 2013/0139501 A1* | 6/2013 | Matsunaga | F15B 1/26 60/562 |
| 2013/0232965 A1* | 9/2013 | Ohnishi | B60T 8/3685 60/545 |
| 2013/0232966 A1* | 9/2013 | Murayama | B60T 7/042 60/545 |
| 2013/0232967 A1* | 9/2013 | Murayama | B60T 7/042 60/545 |
| 2013/0291533 A1* | 11/2013 | Inoue | B60T 7/042 60/545 |
| 2013/0333375 A1* | 12/2013 | Inoue | B60T 7/042 60/545 |
| 2014/0028084 A1 | 1/2014 | Biller et al. | |
| 2014/0216866 A1* | 8/2014 | Feigel | B60T 7/042 188/156 |
| 2014/0298797 A1* | 10/2014 | Murayama | B60T 8/368 60/533 |
| 2015/0158466 A1* | 6/2015 | Nakamura | B60T 11/16 303/3 |
| 2015/0203085 A1* | 7/2015 | Maruo | B60T 8/368 303/10 |

FOREIGN PATENT DOCUMENTS

| | | | | |
|---|---|---|---|---|
| JP | 2003-014110 A | | 1/2003 | |
| JP | 2010195282 A | * | 9/2010 | |
| JP | 2014-525875 A | | 10/2014 | |
| WO | WO-2011099277 A1 | | 8/2011 | |
| WO | 2012143313 | | 10/2012 | |
| WO | WO-2012143311 A1 | | 10/2012 | |
| WO | WO-2013023953 A1 | * | 2/2013 | ............ B60T 7/042 |
| WO | WO-2013-147254 A | | 10/2013 | |

OTHER PUBLICATIONS

Japanese Office Action dated Oct. 27, 2015, in related JP Application No. 2013-257216, 6 pages.
Chinese Office Action for CN Application No. 201410769337.9 dated Jun. 12, 2017, 16 pages.

* cited by examiner

HYDRAULIC PRESSURE GENERATING APPARATUS

CROSS-REFERENCE TO RELATED APPLICATION(S)

This application claims priority from Japanese Patent Application No. 2013-257216 filed on Dec. 12, 2013, the entire contents of which are incorporated herein by reference.

FIELD

An embodiment described herein generally relates to a hydraulic pressure generating apparatus for use in a vehicle brake system.

BACKGROUND

Hydraulic pressure generating apparatuses that generate a brake hydraulic pressure generally include a master cylinder and a motor cylinder (for example, refer to WO-2011-099277-A). The master cylinder uses a brake operator as its drive source, and the motor cylinder uses a motor as its drive source.

The motor may be operated to increase the brake hydraulic pressure in a multiplying fashion, based on an operation amount of a brake pedal.

In such hydraulic pressure generating apparatus, an operation amount of the brake pedal is detected by a stroke sensor. The stroke sensor may be a magnetic sensor that detects a change in magnetic field, that is, a change in magnetic field caused by a rod that is moving, and outputs a detection signal to a control unit.

However, if a hydraulic pressure generating apparatus includes a solenoid valve, the stroke sensor which is disposed in the interior of a base body may be affected by a magnetic field generated from the electromagnetic valve which is also provided in the base body.

SUMMARY

One object of the invention is to provide a hydraulic pressure generating apparatus including a solenoid valve that can prevent a stroke sensor being affected by a magnetic field that is generated by the solenoid valve and that can not only facilitate ensuring a space where to install the hydraulic pressure generating apparatus in a vehicle but also reduce the number of assembling man-hours in installing the hydraulic pressure generating apparatus in the vehicle.

A first aspect of the present invention provides a hydraulic pressure generating apparatus including: a base body having hydraulic pressure lines thereinside; a master cylinder that generates a brake hydraulic pressure by a first piston, the first piston being connected to a brake operator; and a stroke sensor that detects a position of the brake operator, wherein a rear surface of the base body faces the brake operator, and a bottomed-cylindrical-shaped first cylinder bore accommodating the first piston is opened to the rear surface of the base body, an input member that is connected to the brake operator being inserted in the first cylinder bore, wherein the stroke sensor, a plurality of solenoid valves and a control unit are attached to one surface of the base body, and the stroke sensor and the solenoid valves are accommodated within a housing of the control unit, the one surface lying adjacent to the rear surface of the base body, wherein the stroke sensor is disposed on a side of the one surface that lies adjacent to the rear surface of the base body, and wherein the solenoid valves are disposed on the other side of the one surface that lies adjacent to a front surface of the base body.

In this configuration, since the master cylinder is integrated with the stroke sensor, it is easy not only to ensure a space where to install the hydraulic pressure generating apparatus in a vehicle but also to reduce the number of assembling man-hours in installing the hydraulic pressure generating apparatus in the vehicle.

Since the stroke sensor is accommodated within the housing of the control unit, it is easy to connect the stroke sensor to the control unit electrically.

The stroke sensor is disposed on the side of the one surface that lies adjacent to the rear surface of the base body, and the solenoid valves are disposed on the side of the one surface that lies adjacent to the front surface of the base body. By disposing the stoke sensor and the solenoid valves so as to be spaced apart from each other in a front-to-rear direction. Therefore, it is possible to prevent magnetic fields generated from the solenoid valves from affecting the stroke sensor.

A second aspect of the present invention provides, based on the above-mentioned configuration, the hydraulic pressure generating apparatus, further including: a motor cylinder that generates a brake hydraulic pressure by a second piston using a motor as its drive source, wherein a projecting portion is formed on the one surface of the base body, wherein a bottomed-cylindrical-shaped second cylinder bore accommodating the second piston is opened to the other surface opposite to the one surface of the base body, and the motor is attached to the other surface, wherein the projecting portion is accommodated within the housing, and wherein a bottom portion of the second cylinder bore is formed within the projecting portion.

In this configuration, the two devices, that is, the master cylinder and the motor cylinder are configured as one unit. Additionally, the first cylinder bore is opened to the rear surface of the base body, and the second cylinder bore is opened to the one surface of the base body. This enables the master cylinder and the motor cylinder to be disposed well balanced relative to the base body and compact.

When the master cylinder and the motor cylinder are configured as one unit, since the two devices can be connected by hydraulic pressure lines in the base body, external pipings can be omitted or reduced, thereby reducing the number of components and reducing the production costs.

A third aspect of the present invention provides, based on the above-mentioned configuration, the hydraulic pressure generating apparatus, wherein the stroke sensor is disposed closer to the side lying adjacent to the rear surface than a center of the second cylinder bore, and wherein the solenoid valves are disposed closer to the side lying adjacent to the front surface than the center of the second cylinder bore.

When the second cylinder bore is disposed between the stroke sensor and the solenoid valves, the master cylinder and the motor cylinder can be configured as a compact unit while preventing magnetic fields generated from the solenoid valves from affecting the stroke sensor.

A fourth aspect of the present invention provides, based on the above-mentioned configuration, the hydraulic pressure generating apparatus, wherein the one surface of the base body is a side surface of the base body, and wherein the solenoid valves are disposed closer to a side of the one surface that lies adjacent to an upper surface of the base body than the center of the second cylinder bore.

Coils and the like of the solenoid valves are heated to generate heat when the solenoid valves are in operation.

When the solenoid valves are disposed at an upper portion in the housing, the heat generated from the coils and the like of the solenoid valves is made difficult to be transmitted to the other parts accommodated in the housing.

A fifth aspect of the present invention provides, based on the above-mentioned configuration, the hydraulic pressure generating apparatus, wherein at least one of the solenoid valves is disposed in an area lying on one side of an axis of the first cylinder bore, and wherein the remaining solenoid valves are disposed in an area lying on the other side of the axis of the first cylinder bore.

In this configuration, the hydraulic pressure lines between the first cylinder bore and the solenoid valves can be laid out compact.

A sixth aspect of the present invention provides, based on the above-mentioned configuration, the hydraulic pressure generating apparatus, further including: a stroke simulator that imparts a pseudo operating reaction force to the brake operator by a third piston in a biased state, wherein the base body has a bottomed-cylindrical-shaped third cylinder bore accommodating the third piston, wherein the first cylinder bore and the third cylinder bore communicate with each other through the hydraulic pressure line, and wherein the solenoid valve capable of cutting off a communication between the first cylinder bore and the third cylinder bore is disposed closer to the third cylinder bore than the axis of the first cylinder bore.

In this configuration, since the master cylinder, the motor cylinder and the stroke simulator are configured as one unit, it becomes easy to ensure a space where to install the hydraulic pressure generating apparatus in the vehicle.

Since the three devices of the hydraulic pressure generating apparatus can be connected to each other by the hydraulic pressure lines within the base body, external pipings can be omitted or reduced.

Since the solenoid valve that controls the flowing of a brake fluid into the stroke simulator can be laid nearer to the third cylinder bore, the hydraulic pressure line between the solenoid valve for the stoke simulator and the third cylinder bore can be made short.

A seventh aspect of the present invention provides, based on the above-mentioned configuration, the hydraulic pressure generating apparatus, wherein a pressure sensor that detects a brake hydraulic pressure within the hydraulic pressure line is attached to the one surface of the base body, and wherein the pressure sensor is disposed on the side of the one surface that lies adjacent to the front surface of the base body.

When the pressure sensor is disposed near the solenoid valves, mounting holes for the solenoid valves and a mounting hole for the pressure sensor are easy to be worked to be bored, and the hydraulic pressure lines can be laid out compact.

According to the invention, since the master cylinder is integrated with the stroke sensor, the space where to install the hydraulic pressure generating apparatus in the vehicle can easily be ensured, and the number of assembling man-hours in installing the hydraulic pressure generating apparatus in the vehicle can be reduced. Additionally, the stroke sensor and the control unit can easily be connected to each other electrically, and it is possible to prevent the magnetic fields generated from the solenoid valves from affecting the stroke sensor.

DETAILED DESCRIPTION

Figure 1:
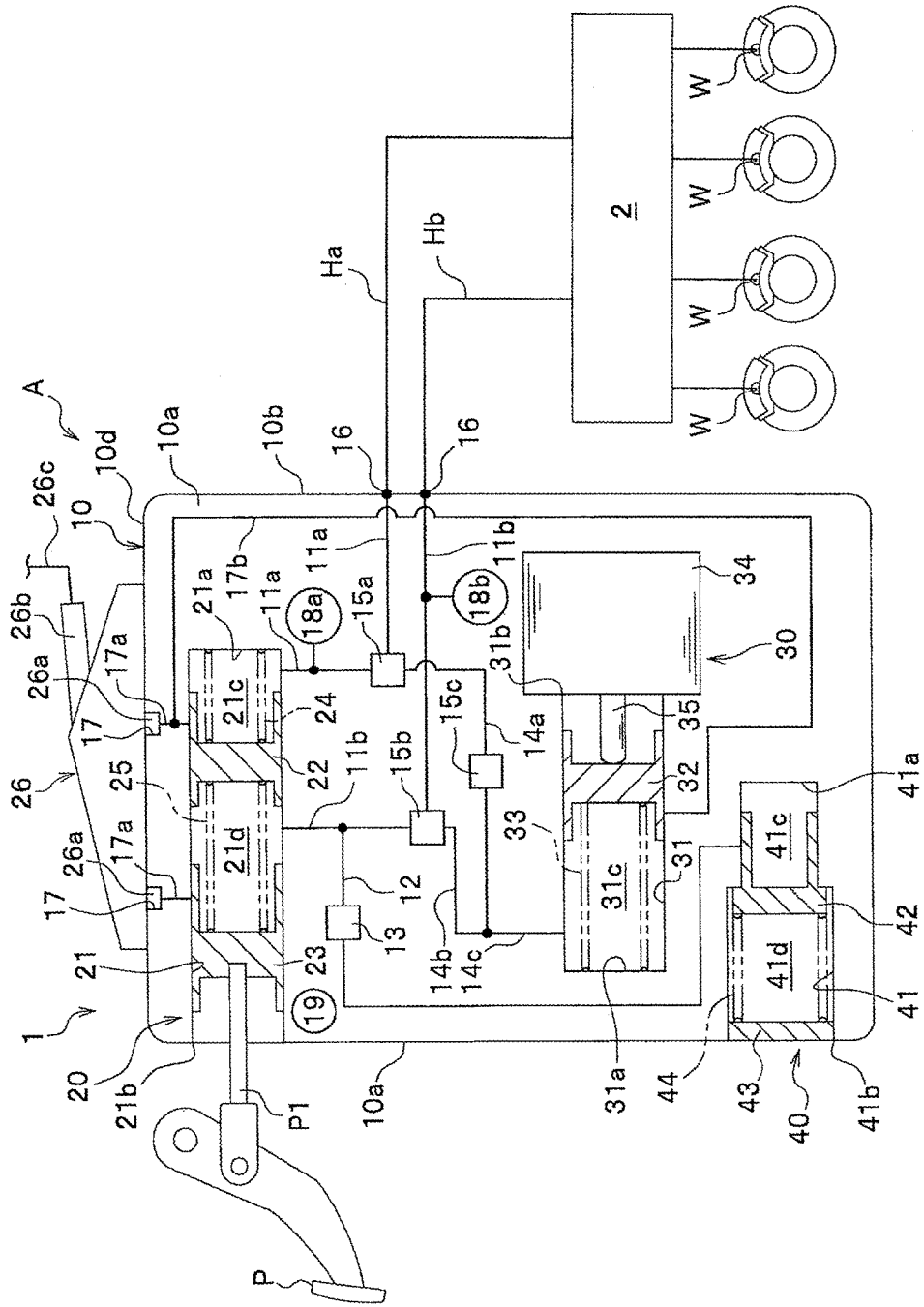
FIG. 1 is a schematic view showing a vehicle brake system that utilizes a hydraulic pressure generating apparatus of a first embodiment.

Embodiments will be described in detail by reference to the drawings as required.

In the embodiments, like reference numerals will be given to like constituent elements, and repeated descriptions will be omitted.

[First Embodiment]

A hydraulic pressure generating apparatus according to a first embodiment will be described as being applied to a vehicle brake system A shown in FIG. 1.

FIG. 1 is a schematic view showing an overall configuration of the vehicle brake system A, and devices shown in FIG. 1 are disposed in positions that are different from positions of devices shown in FIGS. 2 to 6.

As shown in FIG. 1, the vehicle brake system A includes both a brake-by-wire type brake system that operates when a prime motor (an engine, an electric motor or the like) is activated and a hydraulic brake system that operates when the prime motor is stopped.

The vehicle brake system A includes a hydraulic pressure generating apparatus 1 that generates a brake hydraulic pressure according to an operation amount of a brake pedal (a "brake operator") P and a hydraulic pressure control unit 2 that supports the stabilization of vehicle behaviors.

The vehicle brake system A can be installed not only in a motor vehicle that uses only an engine (an internal combustion engine) as a power source but also in a hybrid vehicle that uses a motor in parallel with an engine or an electric vehicle and a fuel cell vehicle in which only a motor is used as a drive source.

Figure 2:
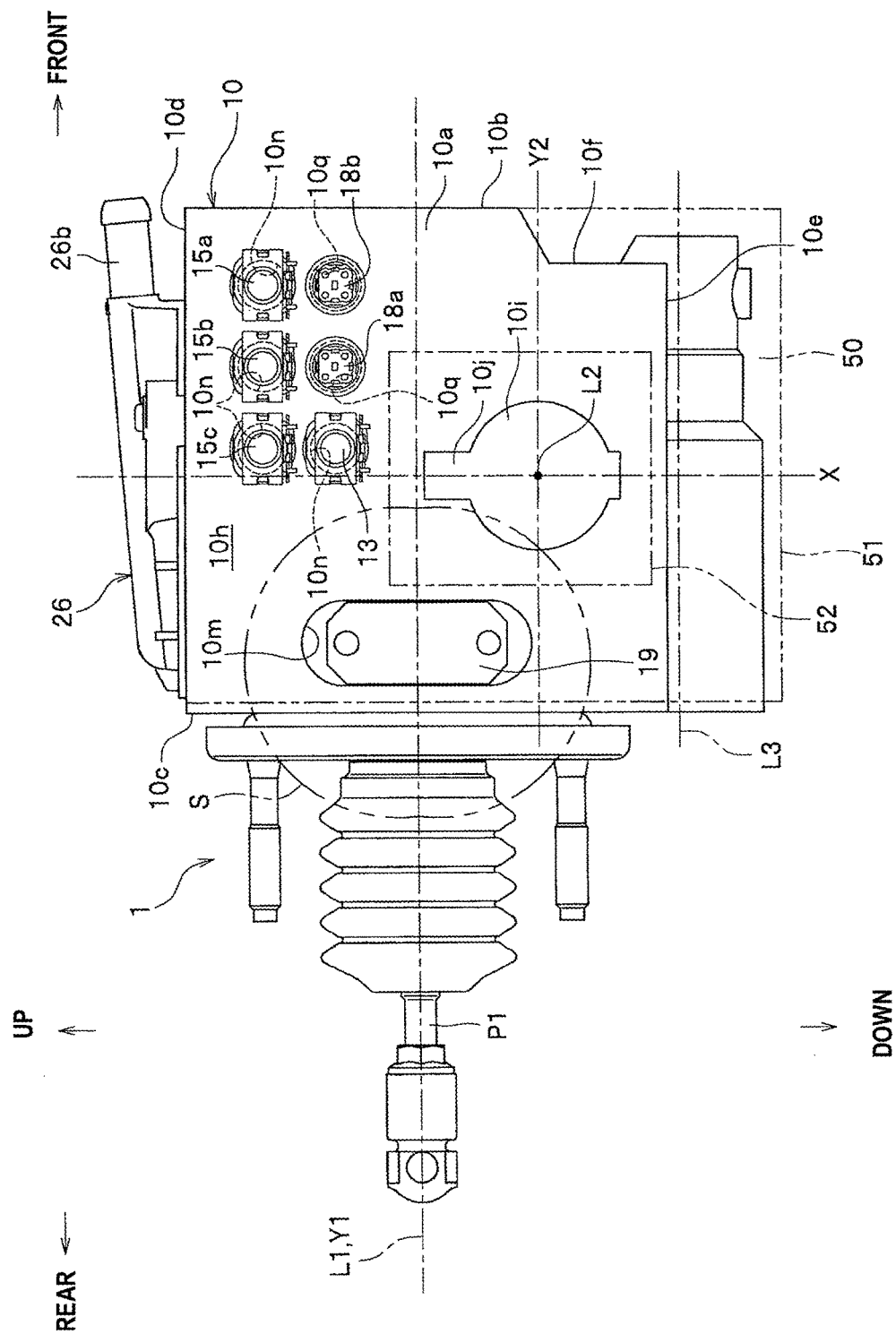
FIG. 2 is a side view showing the hydraulic pressure generating apparatus of the first embodiment.

The hydraulic pressure generating apparatus 1 includes a base body 10, a master cylinder 20 that uses the brake pedal P as its drive source, a motor cylinder 30 that uses a motor 34 as its drive source, a stroke simulator 40 that imparts a pseudo operating reaction force to the brake pedal P, and electronic control unit 50 (refer to FIG. 2).

When referred to in the following description, directions are set for the purpose of describing the hydraulic pressure generating apparatus 1, and the directions generally coincide with directions resulting when the hydraulic pressure generating apparatus 1 is installed in the vehicle. The hydraulic pressure generating apparatus 1 disposed in front of the brake pedal P, and a rear surface 10c of a base body 10 of the hydraulic pressure generating apparatus 1 faces the brake pedal P. A direction in which a rod (an "input member") P1 moves when the brake pedal P is depressed is referred to as a forward direction (towards a front end side), and a direction in which the rod P1 moves when the brake pedal P is released is referred to as a rearward direction (towards a rear end side) (refer to FIG. 2). Directions that intersect horizontally the directions in which the rod P1 moves (the forward and rearward directions) are referred to as leftward and rightward directions (refer to FIG. 3).

Figure 3:
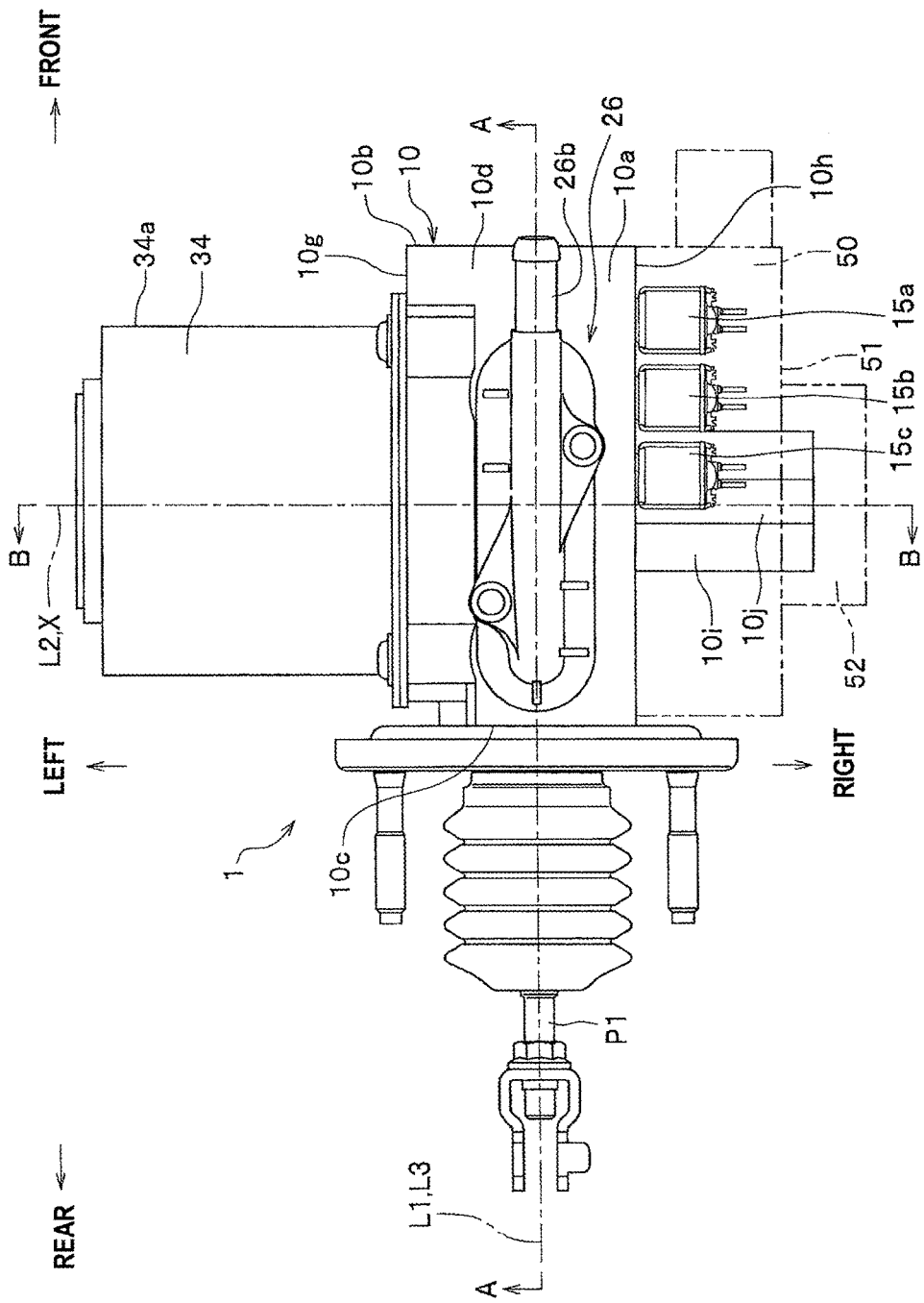
FIG. 3 is a plan view showing the hydraulic pressure generating apparatus of the first embodiment.

The base body 10 is a metallic part (refer to FIGS. 2 and 3) that is installed in the vehicle and includes a main body portion 10a having a substantially rectangular parallelepiped shape. Three cylinder bores 21, 31, 41 and plural hydraulic pressure lines 11a, 11b, 12, 14a, 14b, 14c are formed in an interior of the main body portion 10a. As shown in FIG. 3, parts such as a reservoir 26, the motor 34 and the like are attached to the base body 10. The rod P1 is disposed on a rear surface 10c of the base body 10.

As shown in FIG. 2, part of the main body portion 10a is removed at a lower portion of a front surface 10b of the main body portion 10a to thereby form a clearance portion 10f. The clearance portion 10f is a portion where the lower portion of the front surface 10b of the main body portion 10a is depressed further rearwards than an upper portion of the front surface 10b. That is, a cutout is formed at the lower portion of the front surface 10b of the main body portion 10a.

A stroke sensor 19, solenoid valves 13, 15a, 15b, 15c, pressure sensors 18a, 18b and a control unit 50 are attached to a right side surface ("one surface") 10h of the main body portion 10a.

In FIGS. 2 and 3, the control unit 50 is indicated by imaginary lines so that the arrangement of the stroke sensor 19, the pressure sensors 18a, 18b and the solenoid valves 13, 15a, 15b, 15c is shown clearly.

The stroke sensor 19, the solenoid valves 13, 15a, 15b, 15c and both the pressure sensors 18a, 18b are installed individually in plural mounting holes 10m, 10n, 10q that are opened to the right side surface of the main body portion 10a.

As shown in FIG. 3, a cylindrical projecting portion 10i is provided on the right side surface 10h of the main body portion 10a so as to project therefrom. The projecting portion 10i is provided at a lower portion below a center of the right side surface 10h in relation to a front-to-rear direction of the main body portion 10a and is accommodated in a housing 51 of the control unit 50.

An elongated projection 10j is formed at an upper end portion of a circumferential wall portion of the projecting portion 10i. The elongated projection 10j extends in an axial direction of the projecting portion 10i (a left-to-right direction of the main body portion 10a).

Figure 4:
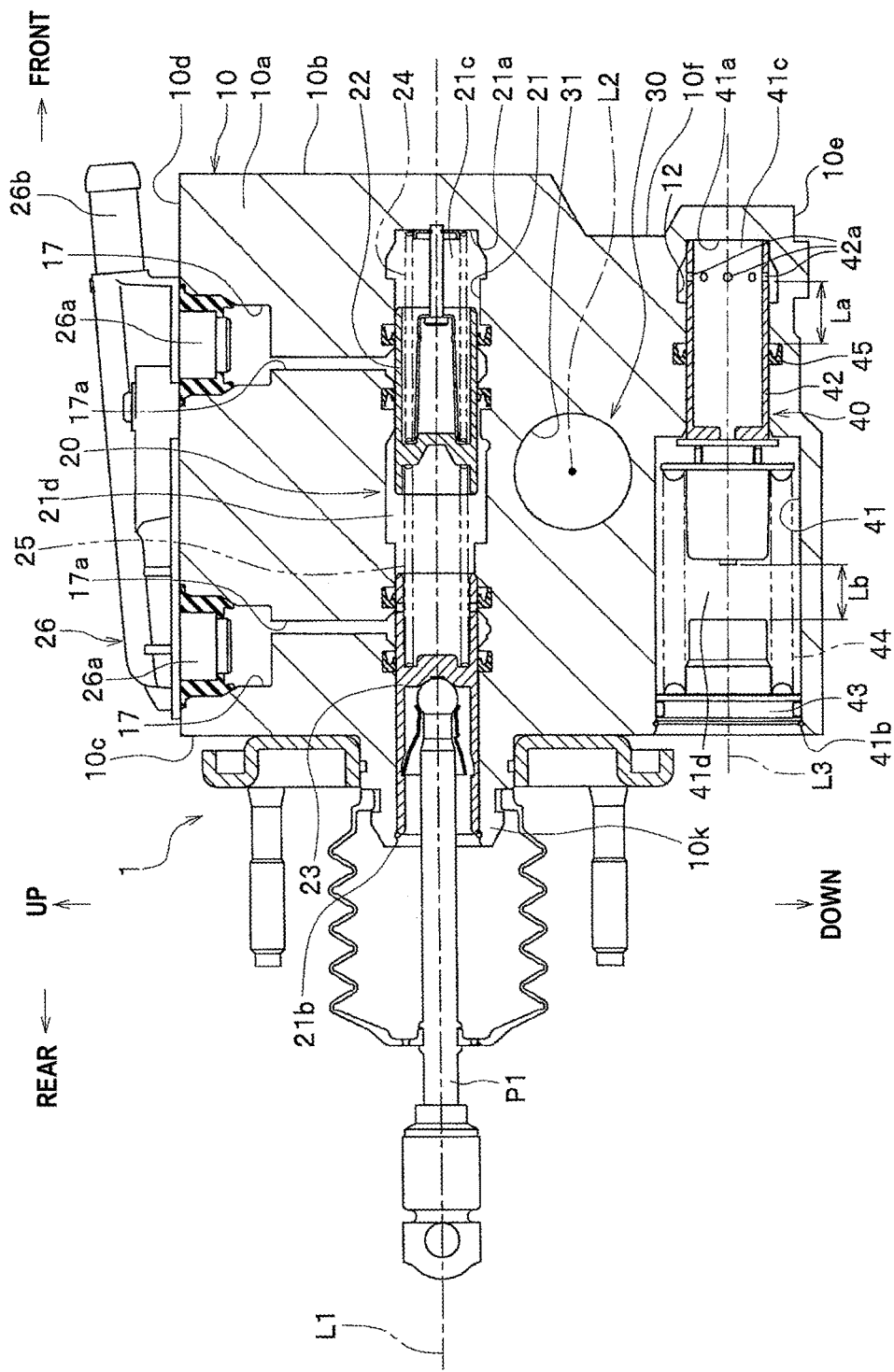
FIG. 4 is a sectional view taken along a line A-A in FIG. 3, showing the hydraulic pressure generating apparatus of the first embodiment.

As shown in FIG. 4, a first cylinder bore 21, which is one of the three cylinder bores, is a bottomed cylindrical bore. An axis L1 of the first cylinder bore 21 extends in the front-to-rear direction. The first cylinder bore 21 is opened to an end face of a cylindrical portion 10k that is formed on the rear surface 10c of the main body portion 10k.

Figure 5:
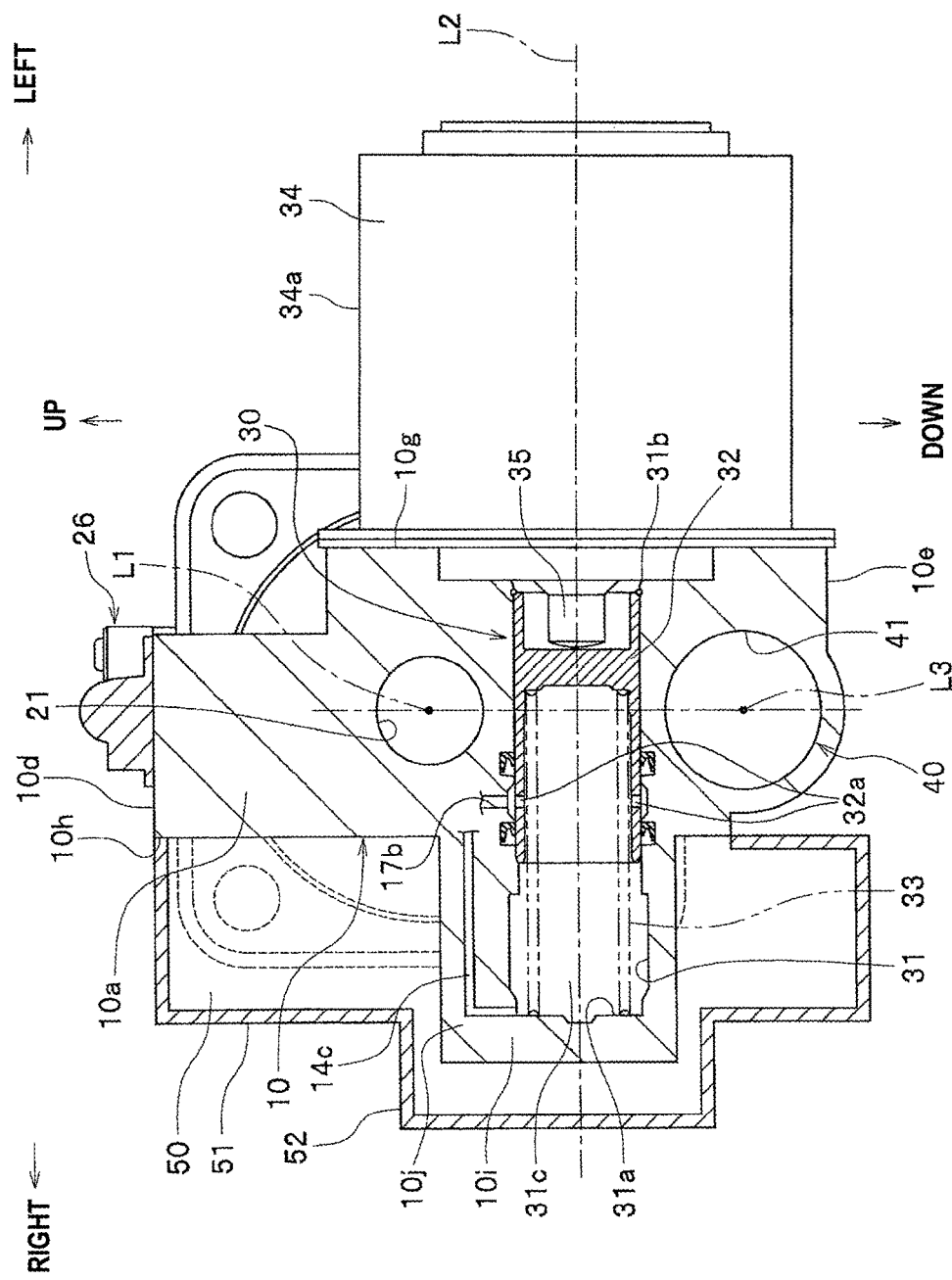
FIG. 5 is a sectional view taken along a line B-B in FIG. 3, showing the hydraulic pressure generating apparatus of the first embodiment.

As shown in FIG. 5, a second cylinder bore 31, which is another of the three cylinder bores, is a bottomed cylindrical bore that is disposed so as to be spaced apart downwards from the first cylinder bore 21. An axis L2 of the second cylinder bore 31 extends in the left-to-right direction and intersects the axis L1 of the first cylinder bore 21 therebelow vertically (refer to FIG. 3). The second cylinder bore 31 is opened to a left side surface (the "other surface") 10g of the main body portion 10a.

A bottom surface 31a of the second cylinder bore 31 is disposed within the projecting portion 10i. Namely, a bottom portion of the second cylinder bore 31 is disposed within the projecting portion 10i and is accommodated within the housing 51 of the control unit 50.

As shown in FIG. 4, a third cylinder bore 41, which the other of the three cylinder bores, is a bottomed cylindrical bore that is disposed so as to be spaced apart downwards from the first cylinder bore 21 and the second cylinder bore 31. An axis L3 of the third cylinder bore 41 is parallel to the axis L1 of the first cylinder bore 21. The third cylinder bore 41 is opened to the rear surface 10c of the main body portion 10a.

In the first embodiment, the first cylinder bore 21 and the third cylinder bore 41 are provided parallel, and the second cylinder bore 31 is disposed between the first cylinder bore 21 and the third cylinder bore 41. Then, when the axis L1 of the first cylinder bore 21 and the axis L3 of the third cylinder bore 41 are projected on a horizontal plane that passes through the axis L2 of the second cylinder bore 31, the axis L2 of the second cylinder 31 intersects the axis L1 of the first cylinder bore 21 and the axis L3 of the third cylinder bore 41 at right angles (refer to FIG. 3). As shown in FIG. 5, the axis L2 of the second cylinder bore 31 intersects a vertical straight line that connects the axis position of the first cylinder bore 21 to the axis position of the third cylinder bore 41 at right angles.

As shown in FIG. 4, the master cylinder 20 includes two first cylinders 22, 23 (a secondary piston and a primary piston) that are inserted into the first cylinder bore 21 and two elastic members 24, 25 that are accommodated in the first cylinder bore 21.

A bottom surface side pressure chamber 21c is defined between a bottom surface 21a of the first cylinder bore 21 and the first piston 22 (the secondary piston) that is disposed to face the bottom surface 21a. A first elastic member 24, which is one of the two elastic members 24, 25, is made up of a coil spring and is accommodated in the bottom surface pressure chamber 21c.

An opening side pressure chamber 21d is defined between the first piston 22 that is disposed to face the bottom surface 21a and the first piston 23 (the primary piston) that is disposed to face an opening portion 21b of the first cylinder bore 21. A second elastic member 25, which is the other of the two elastic members 24, 25, is made up of a coil spring and is accommodated in the opening side pressure chamber 21d.

The rod P1 of the brake pedal P is inserted from the opening portion 21b into the first cylinder bore 21. A distal end portion (a front end portion) of the rod P1 is connected to a rear end portion of the first piston 23 that is disposed to face the opening portion 21b. In this configuration, the first piston 23 disposed to face the opening portion 21b is connected to the brake pedal P (refer to FIG. 1) via the rod P1. Both the first pistons 22, 23 receive depressing effort exerted on the brake pedal P to slide within the first cylinder bore 21 so as to pressurize a brake fluid in the bottom surface side pressure chamber 21c and a brake fluid in the opening side pressure chamber 21d, respectively.

As shown in FIG. 1, a reservoir 26 is connected to the first cylinder bore 21. The reservoir 26 is a container that reserves a brake fluid and is attached to an upper surface 10d of the main body portion 10a. Two fluid supply portions 26a, 26b that are provided on a lower surface of the reservoir 26 so as to project therefrom are inserted individually into two reservoir union ports 17, 17 that are formed in the upper surface 10d of the main body portion 10a.

Communication holes 17a, 17a are opened to bottom surfaces of the two reservoir union ports 17, 17 so as to communicate with an inner circumferential surface of the first cylinder bore 21. A fluid supply line 17b that communicates with an inner circumferential surface of the second cylinder bore 31 is connected to the communication hole 17a that is one of the communication holes 17a, 17a.

A hose 26c that extends from a main reservoir (not shown) is connected to a fluid supply tube 26b of the reservoir 26.

As shown in FIG. 5, the motor cylinder 30 includes a second piston 32 that is inserted into the second cylinder bore 31, an elastic member 33 that is accommodated in the second cylinder bore 31, and the motor 34.

A pressure chamber 31c is defined between a bottom surface 31a of the second cylinder bore 31 and the second piston 32. The elastic member 33 is accommodated in the pressure chamber 31c.

The fluid supply line 17b that communicates with the reservoir union port 17 (refer to FIG. 1) is opened to the inner circumferential surface of the second cylinder bore 31. Thus, the brake fluid can be supplied from the fluid supply line 17b to the pressure chamber 31c through a fluid supply port 32a that is formed in a circumferential wall portion of the second piston 32.

The motor 34 is an electric servo motor that is controlled to be driven by the control unit 50. The motor 34 is attached to the left side surface 10g of the main body portion 10a. A rod 35 projects from a central portion of a right end face of a case 34a of the motor 34 to the left.

A drive transmission portion is accommodated within the case 34a of the motor 34. This drive transmission portion converts a rotational driving force of an output shaft of the motor 34 into a straight axial force. The drive transmission portion is made up, for example, of a ball screw mechanism. When the rotational driving force of the output shaft of the motor 34 is inputted into the drive transmission portion, a straight axial force is imparted to the rod 35 from the drive transmission portion, whereby the rod 35 moves back and forth in the left-to-right direction.

The rod 35 is inserted from an opening portion 31b into the second cylinder bore 31. An axis of the rod 35 is disposed coaxial with the axis L2 of the second cylinder bore 31. Namely, a center position of the case 34a of the motor 34 coincides with the axis L2 of the second cylinder bore 31. Then, when a right end face of the case 34a is projected on to a plane that passes through the axis L1 of the first cylinder bore 21 and the axis L3 of the third cylinder bore 41, the right end face of the case 34a overlaps partially the first cylinder bore 21 and the third cylinder bore 41.

A distal end portion of the rod 35 is brought into abutment with the second piston 32. Then, when the rod 35 moves to the right, the second piston 32 receives an input from the rod 35 to slide within the second cylinder bore 31 so as to pressurize a brake fluid within the pressure chamber 31c.

As shown in FIG. 4, the stroke simulator 40 includes a third piston 42 that is inserted into the third cylinder bore 41, a lid member 43 that closes an opening portion 41b of the third cylinder bore 41, and an elastic member 44 that is accommodated within the third cylinder bore 41.

A bottom surface side pressure chamber 41c is defined between a bottom surface 41a of the third cylinder bore 41 and the third piston 42. In the third cylinder bore 41, an opening side pressure chamber 41d is defined between the lid member 43 and the third piston 42. An elastic member 44 that is made up of a coil spring is accommodated within the opening side pressure chamber 41d.

Plural fluid supply ports 42a are formed in a circumferential wall portion of the third piston 42. In this configuration, the brake fluid is allowed to flow from a branch hydraulic pressure line 12 into the third piston 42 through the fluid supply ports 42a, whereas the brake fluid is allowed to flow out of an interior of the third piston 42 into the branch hydraulic pressure line 12 through the fluid supply ports 42a.

A distance La between a seal member 45 provided on an inner circumferential surface of the third cylinder bore 41 and the fluid supply ports 42a is set larger than a distance Lb between the lid member 43 and the third piston 42. In this configuration, even though the third piston 42 moves towards the lid member 43 to its full extent, the fluid supply ports 42a are still situated on a side of the seal member 45 that faces the bottom surface 41a.

In the stroke simulator 40, the third piston 42 moves towards the lid member 43 against a biasing force of the elastic member 44 by a brake hydraulic pressure that is generated in the opening side pressure chamber 21d of the master cylinder 20. Then, a pseudo operating reaction force is imparted to the brake pedal P (refer to FIG. 1) by the third piston 42 that is biased by the brake hydraulic pressure.

Next, the hydraulic pressure lines formed in the base body 10 will be described.

As shown in FIG. 1, two main hydraulic pressure lines 11a, 11b are hydraulic pressure lines that originate from the first cylinder bore 21 of the master cylinder 20.

A first main hydraulic pressure line 11a communicates with the bottom surface side pressure chamber 21c of the master cylinder 20. Also, a second main hydraulic pressure line 11b communicates with the opening side pressure chamber 21d of the master cylinder 20. Pipings Ha, Hb that reach the hydraulic pressure control unit 2 are connected individually to two output ports 16, 16 that are terminating points of both the main hydraulic pressure lines 11a, 11b.

The branch hydraulic pressure line 12 is a hydraulic pressure line that starts from the bottom surface side pressure chamber 41c of the stroke simulator 40 to reach the second main hydraulic pressure line 11b. Namely, the first cylinder bore 21 of the master cylinder 20 communicates with the third cylinder bore 41 of the stroke simulator 40 through the second main hydraulic pressure line 11b and the branch hydraulic pressure line 12.

A normally closed solenoid valve 13 is provided on the branch hydraulic pressure line 12. The normally closed solenoid valve 13 is a solenoid valve that can cut off a communication between the first cylinder bore 21 and the third cylinder bore 41.

A third communicating hydraulic pressure line 14c is a hydraulic pressure line that originates from the second cylinder bore 31 of the motor cylinder 30. As shown in FIG. 5, part of the third communicating hydraulic pressure line 14c is disposed in the elongated projection 10j of the projecting portion 10i. Then, the third communicating hydraulic pressure line 14c communicates with a bottom portion of the second cylinder bore 31.

As shown in FIG. 1, a first communicating hydraulic pressure line 14a and a second communicating hydraulic pressure line 14b are hydraulic pressure lines that originate from the third communicating hydraulic pressure line 14c. The first communicating hydraulic pressure line 14a establishes a communication from the third communicating hydraulic pressure line 14c to the first main hydraulic pressure line 11a. The second communicating hydraulic pressure line 14b establishes a communication from the third communicating hydraulic pressure line 14c to the second main hydraulic pressure line 11b.

In the first main hydraulic pressure line 11a, a first selector valve 15a, which is a two-position, three-port three way valve, is provided at a location where the first main hydraulic pressure line 11a connects to the first communicating hydraulic pressure line 14a. The first selector valve 15a is mounted in a solenoid valve mounting hole 10n (refer to FIG. 2) that communicates with the first main hydraulic pressure line 11a.

The first selector valve 15a is a solenoid valve. In a first position (an initial state) where the first selector valve 15a is de-energized, the first selector valve 15a cuts off a communication between the first communicating hydraulic pressure line 14a and the first main hydraulic pressure line 11a while establishing a communication between an upstream side (a side facing the master cylinder 20) and a downstream side (a side facing the output port 16) of the first main hydraulic pressure line 11a.

In a second position where the first selector valve 15a is energized, the first selector valve 15a establishes a communication between the first communicating hydraulic pressure line 14a and the first main hydraulic pressure line 11a while cutting off the communication between the upstream side and the downstream side of the first main hydraulic pressure line 11a.

In the second main hydraulic pressure line 11b, a second selector valve 15b, which is a two-position, three-port three way valve, is provided at a location where the second main hydraulic pressure line 11b connects to the second communicating hydraulic pressure line 14b. The second selector valve 15b is mounted in a solenoid valve mounting hole 10n (refer to FIG. 2) that communicates with the second main hydraulic pressure line 11b.

The second selector valve 15b is a solenoid valve. In a first position (an initial state) where the second selector valve 15b is de-energized, the second selector valve 15b cuts off a communication between the second communicating hydraulic pressure line 14b and the second main hydraulic pressure line 11b while establishing a communication between an upstream side (a side facing the master cylinder 20) and a downstream side (a side facing the output port 16) of the second main hydraulic pressure line 11b.

In a second position where the second selector valve 15b is energized, the second selector valve 15b establishes a communication between the second communicating hydraulic pressure line 14b and the second main hydraulic pressure line 11b while cutting off the communication between the upstream side and the downstream side of the second main hydraulic pressure line 11b.

In the first communicating hydraulic pressure line 14a, a normally open solenoid valve 15c is provided upstream of a portion where the first communicating hydraulic pressure line 14a connects to the third communicating hydraulic pressure line 14c (or at a portion lying nearer to the master cylinder 20 than the connecting portion). The normally open solenoid valve 15c is mounted in a solenoid valve mounting hole 10n (refer to FIG. 2) that communicates with the first communicating hydraulic pressure line 14a.

Two pressure sensors 18a, 18b detect a magnitude of brake hydraulic pressure and are mounted individually in pressure sensor mounting holes 10q, 10q (refer to FIG. 2) that communicate with the main hydraulic pressure lines 11a, 11b. Information acquired at both the pressure sensors 18a, 18b is outputted to the control unit 50 (refer to FIG. 2).

The first pressure sensor 18a is disposed upstream of the first selector valve 15a and detects a brake hydraulic pressure generated in the master cylinder 20.

The second pressure sensor 18b is disposed downstream of the second selector valve 15b and detects a brake hydraulic pressure generated in the motor cylinder 30 when the second communicating hydraulic pressure line 14b communicates with the downstream side of the second main hydraulic pressure line 11b.

The stroke sensor 19 is a magnetic sensor that detects magnetically a position of the rod P1 of the brake pedal P. As shown in FIG. 2, the stroke sensor 19 is mounted in a stroke sensor mounting hole 10m that is formed in the right side surface 10h when the base body 10 is seen from the front side.

A magnet (not shown) is attached to the rod P1. The stroke sensor 19 detects a position of the rod P1 by detecting a change in magnetic field that is caused by the rod P1 that is moving. The stroke sensor 19 outputs a detection signal that signals the position of the rod P1 to the control unit 50 (refer to FIG. 3). In the control unit 50, a depression amount of the brake pedal P is detected based on the information from the stroke sensor 19.

As shown in FIGS. 2 and 3, the control unit 50 has the housing 51. The housing 51 is a resin box that is attached to the right side surface 10h of the main body portion 10a of the base body 10. A control circuit board (not shown) is accommodated in the housing 51.

The housing 51 accommodates therein the stroke sensor 19, the individual solenoid valves 13, 15a, 15b, 15c and both the pressure sensors 18a, 18b that all project from the right side surface 10h of the main body portion 10a.

The housing 51 accommodates therein the projecting portion 10i of the main body portion 10a. A projecting portion 52 is formed on a right side surface of the housing 51. The projecting portion 52 is a bottomed cylindrical portion and has a space where to accommodate therein a distal end portion of the projecting portion 10i. Namely, only the portion that is necessary to accommodate the distal end portion of the projecting portion 10i is expanded without increasing the thickness of the whole of the housing 51 in the left-to-right direction.

As shown in FIG. 1, the control unit 50 controls the operation of the motor 34, the opening and closing of the normally closed solenoid valve 13, the opening and closing of the normally open solenoid valve 15c and the switching over of the selector valves 15a, 15b based on the information obtained from both the pressure sensors 18a, 18b, the stroke sensor 19 and the like, a program that is stored in advance and the like.

The hydraulic pressure control unit 2 is configured so as to execute various hydraulic pressure controls such as anti-lock braking control, vehicle behavior stabilization control and the like by controlling brake hydraulic pressures that are imparted to wheel cylinders W of wheel brakes as required. The hydraulic pressure control unit 2 is connected to the wheel cylinders W through pipings.

Although the illustration is omitted, the hydraulic pressure control unit 2 includes a hydraulic pressure unit that includes a solenoid valve, a pump and the like, a motor that drives the pump, a controller that controls the solenoid valve, the motor and the like, and the like.

Next, as shown in FIG. 2, the arrangement of the stroke sensor 19, the solenoid valves 13, 15a, 15b, 15c and both the pressure sensors 18a, 1.8b.

The stroke sensor 19 is disposed in an area that lies closer to the rear surface 10c than the axis L2 (the center position) of the second cylinder bore 31 (refer to FIG. 4) on the right side surface 10h of the main body portion 10a. Namely, the stroke sensor 19 is disposed closer to the rear surface 10c than a plane (indicated by an alternate long and short dash line X in FIG. 2) that passes through the axis L2 while being normal to the axis L1.

The solenoid valves 13, 15a, 15b, 15c and the pressure sensors 18a, 18b are disposed in an area that lies closer to the front surface 10b of the main body portion 10a than the axis L2 (the center position) of the second cylinder bore 31 (refer to FIG. 4). Namely, the solenoid valves 13, 15a, 15b, 15c and the pressure sensors 18a, 18b are disposed closer to the front surface 10*b* than the plane (indicated by the alternate long and short dash line X in FIG. 2) that passes through the axis L2 while being normal to the axis L1.

In this arrangement, the stroke sensor 19 is spaced apart in the front-to-rear direction from the solenoid valves 13, 15*a*, 15*b*, 15*c* and the pressure sensors 18*a*, 18*b* on the right side surface 10*h* of the main body portion 10*a*.

In the first embodiment, coils of the solenoid valves are partially disposed nearer to the back surface 10*c* than the axis L2. In this embodiment, the solenoid valve is defined as being disposed nearer to the front surface 10*b* than the axis L2 as long as the center position of the solenoid valve (the center axis of the solenoid valve) is disposed nearer to the front surface 10*b* than the axis L2.

In case the solenoid valves 13, 15*a*, 15*b*, 15*c* are disposed within an area S that surrounds the circumference of the stroke sensor 19, there is a possibility that the stroke sensor 19 is affected by magnetic fields that are generated from the solenoid valves 13, 15*a*, 15*b*, 15*c*.

Then, the stroke sensor 19 is spaced apart in the front-to-rear direction from the solenoid valves 13, 15*a*, 15*b*, 15*c*, so that the solenoid valves 13, 15*a*, 15*b*, 15*c* are disposed outside the area S surrounding the circumference of the stroke sensor 19.

The solenoid valves 13, 15*a*, 15*b*, 15*c* and the pressure sensors 18*a*, 18*b* are disposed nearer to the upper surface 10*d* than the axis L2 (the center position) of the second cylinder bore 31 (refer to FIG. 4) on the right side surface 10*h* of the main body portion 10*a*. Namely, the solenoid valves 13, 15*a*, 15*b*, 15*c* and the pressure sensors 18*a*, 18*b* are disposed nearer to the upper surface 10*d* than a plane (indicated by an alternate long and short dash line Y1 in FIG. 2) that passes through the axis L2 while being parallel to the axis L1.

The solenoid valves 13, 15*a*, 15*b*, 15*c* and the pressure sensors 18*a*, 18*b* are disposed nearer to the upper surface 10*d* than the axis L1 of the first cylinder bore (refer to FIG. 4) on the right side surface 10*h* of the main body portion 10*a*. Namely, the solenoid valves 13, 15*a*, 15*b*, 15*c* and the pressure valves 18*a*, 18*b* are disposed nearer to the upper surface 10*d* than a plane (indicated by an alternate long and short dash line Y2 in FIG. 2) that passes through the axis L1 while being parallel to the axis L2.

The projecting portion 10*i* is disposed lower than the axis L1 on the right side surface 10*h* of the main body portion 10*a*, and the clearance portion 10*f* is formed at the lower portion of the front surface 10*b* of the main body portion 10*a* by removing part of the lower portion. Then, the space on the right side surface 10*h* can be made effective use of by disposing the solenoid valves 13, 15*a*, 15*b*, 15*c* and the pressure sensors 18*a*, 18*b* upper than the axis L1 on the right side surface 10*h* of the main body portion 10*a*.

Next, the operation of the vehicle brake system A will be described briefly.

In the vehicle brake system A, as shown in FIG. 1, when an ignition switch of the vehicle is turned on or the stroke sensor 19 detects that the brake pedal P is slightly depressed, the first selector valve 15*a* establishes a communication between the first communicating hydraulic pressure line 14*a* and the downstream side of the first main hydraulic pressure line 11*a* while cutting off the communication between the upstream side and the downstream side of the first main hydraulic pressure line 11*a*. The second selector valve 15*b* establishes a communication between the second communicating hydraulic pressure line 14*b* and the downstream side of the second main hydraulic pressure line 11*b* while cutting off the communication between the upstream side and the downstream side of the second main hydraulic pressure line 11*b*. The normally closed solenoid valve 13 is opened.

In this state, the brake hydraulic pressure generated in the master cylinder 20 by the depression of the brake pedal P is transmitted to the stroke simulator 40 without being transmitted to the wheel cylinders W. Then, the brake hydraulic pressure in the bottom surface side pressure chamber 41*c* becomes large, and the third piston 42 moves towards the lid member 43 against a biasing force of the elastic member 44, whereby the stroke of the brake pedal P is permitted. As this occurs, a pseudo operating reaction force is imparted to the brake pedal P by the third piston 42 that is biased by the elastic member 44.

When a depression of the brake pedal P is detected by the stroke sensor 19, the motor 34 of the motor cylinder 30 is driven, and the second piston 32 moves towards the bottom surface 31*a*, whereby the brake fluid in the pressure chamber 31*c* is pressurized.

The control unit 50 compares the brake hydraulic pressure outputted from the motor cylinder 30 (the brake hydraulic pressure detected by the second pressure sensor 18*b*) with the brake hydraulic pressure outputted from the master cylinder 20 (the brake hydraulic pressure detected by the first pressure sensor 18*a*) and controls the rotational speed of the motor 34 based on the results of the comparison. In this way, in the hydraulic pressure generating apparatus 1, the brake hydraulic pressure is generated according to the depression amount of the brake pedal P.

The brake hydraulic pressure generated in the hydraulic pressure generating apparatus 1 is transmitted to the wheel cylinders W through the hydraulic pressure control unit 2, and this activates the wheel cylinders W to thereby impart braking forces individually to the wheels.

In case something abnormal occurs in the brake hydraulic pressure detected by the second pressure sensor 18*b* in such a state that the second piston 32 of the motor cylinder 30 is receiving an input from the rod 35, the normally open solenoid valve 15*c* is closed. In case the brake hydraulic pressure detected by the second pressure sensor 18*b* is increased by the closure of the normally open solenoid valve 15*c*, it means that the hydraulic pressure line on the first communicating hydraulic pressure line 14*a* side is failing. In case the brake hydraulic pressure detected by the second pressure sensor 18*b* is not increased, it means that the hydraulic pressure line on the second communicating hydraulic pressure line 14*b* side is failing.

In such a state that the motor cylinder 30 does not operate (for example, no electric power is available), the first selector valve 15*a* cuts off the communication between the first communicating hydraulic pressure line 14*a* and the first main hydraulic pressure line 11*a* while establishing a communication between the upstream side and the downstream side of the first main hydraulic pressure line 11*a*. The second selector valve 15*b* cuts off the communication between the second communicating hydraulic pressure line 14*b* and the second main hydraulic pressure line 11*b* while establishing a communication between the upstream side and the downstream side of the second main hydraulic pressure line 11*b*. The normally closed solenoid valve 13 is closed. In this state, the brake hydraulic pressure generated in the master cylinder 20 is transmitted to the individual wheel cylinders W.

In the above-described hydraulic pressure generating apparatus 1, as shown in FIG. 4, the cylinder bores 21, 31, 41 for the master cylinder 20, the motor cylinder 30 and the stroke simulator 40 are provided in the base body 10, and the three devices are configured as one unit.

The first cylinder bore 21 and the third cylinder bore 41 are opened to the rear surface 10c of the main body portion 10a of the base body 10, and the second cylinder bore 31 is opened to the left side surface 10g (refer to FIG. 5) of the main body portion 10a. The axis L2 of the second cylinder bore 31 intersects the axes L1, L3 of the first cylinder bore 21 and the third cylinder bore 41 therebetween vertically. This configuration enables the master cylinder 20, the motor cylinder 30 and the stroke simulator 40 to be disposed with good balance in the base body 10.

Namely, the longitudinal directions of the master cylinder 20 and the stoke simulator 40 intersect the longitudinal direction of the motor cylinder 30 at right angles so that the master cylinder 20, the motor cylinder 30 and the stroke simulator 40, which are configured as the separate units, are accommodated properly in the substantially three-dimensional space.

Consequently, in the hydraulic pressure generating apparatus 1 of the first embodiment, the master cylinder 20, the motor cylinder 30 and the stroke simulator 40 can be configured as the compact units. Then, a space where to install the hydraulic pressure generating apparatus 1 in the vehicle can easily be ensured, and the number of assembling man-hours in installing the hydraulic pressure generating apparatus 1 in the vehicle can be reduced.

In the hydraulic pressure generating apparatus 1, as shown in FIG. 5, the second cylinder bore 31 is disposed between the first cylinder bore 21 and the third cylinder bore 41. Because of this, the motor 34 of the motor cylinder 30 is attached to the base body 10 in a position lying between the master cylinder 20 and the stroke simulator 40, which enables the motor 34 to be disposed with good balance relative to the base body 10.

In the hydraulic pressure generating apparatus 1, as shown in FIG. 4, the first cylinder bore 21 and the third cylinder bore 41 are opened to the rear surface 10c of the main body portion 10a of the base body 10. Consequently, in boring the first cylinder bore 21 and the third cylinder bore 41 in the main body portion 10a from one direction, boring tools are inserted in the same direction, thereby making it possible to improve the workability in boring the cylinder bores 21, 41.

In the hydraulic pressure generating apparatus 1, as shown in FIG. 1, the master cylinder 20, the motor cylinder 30 and the stroke simulator 40 are configured as the separate units. This enables the three devices to be connected by the hydraulic pressure lines in the base body 10, thereby making it possible to omit or reduce external pipings.

As shown in FIG. 2, the stroke sensor 19 is accommodated in the housing 51 of the control unit 50. Thus, the stroke sensor 19 can easily be connected to the control unit 50 electrically.

As shown in FIG. 2, the stroke sensor 19 and the solenoid valves 13, 15a, 15b, 15c are spaced apart from each other in the front-to-rear direction. Thus, it is possible to prevent the stroke sensor 19 from being affected by magnetic fields that are generated from the solenoid valves 13, 15a, 15b, 15c.

By disposing the second cylinder bore 31 between the stroke sensor 19 and the solenoid valves 13, 15a, 15b, 15c and the pressure sensors 18a, 18b (refer to FIG. 4), not only can the stroke sensor 19 be prevented from being affected by the magnetic fields that are generated from the solenoid valves 13, 15a, 15b, 15c, but also the master cylinder 20 and the motor cylinder 30 can be configured as the compact units, as shown in FIG. 4.

As shown in FIG. 2, the pressure sensors 18a, 18b are disposed near the solenoid valves 13, 15a, 15b, 15c. Thus, the mounting holes 10n of the solenoid valves 13, 15a, 15b, 15c and the mounting holes 10q, 10q of the pressure sensors 18a, 18b can easily be bored, and the hydraulic pressure lines can be laid out compact.

The coils of the solenoid valves 13, 15a, 15b, 15c are heated to generate heat when the solenoid valves 13, 15a, 15b, 15c operates. In the hydraulic pressure generating apparatus 1, the solenoid valves 13, 15a, 15b, 15c are disposed at the upper portion in the housing 51. Thus, the heat generated by the coils of the solenoid valves 13, 15a, 15b, 15c is made difficult to be transmitted to other parts accommodated in the housing 51 such as the control circuit board and the like.

In the hydraulic pressure generating apparatus 1, as shown in FIG. 5, a part of the third communicating hydraulic pressure line 14c is disposed in the elongated projection 10j of the projecting portion 10i of the base body 10. Thus, the hydraulic pressure line that communicates with the second cylinder bore 31 is disposed compact.

In the first embodiment, while part of the third communicating hydraulic pressure line 14c is disposed in the circumferential wall portion of the projecting portion 10i without increasing the overall thickness of the circumferential wall portion by providing the elongated projection 10j on the circumferential wall portion of the projecting portion 10i, part of the third communicating hydraulic pressure line 14c may be disposed within the cylindrical circumferential wall portion.

There is imposed no limitation on the shape of the projecting portion 10i, and hence, for example, the projecting portion may be formed into a rectangular parallelepiped.

In the hydraulic pressure generating apparatus 1, as shown in FIG. 2, the clearance portion 10f is formed at the lower portion of the front surface 10b of the main body portion 10a of the base body 10. This can prevent the interference of the lower portion 10f of the front surface 10b of the base body 10 with a space where to install some vehicle constituent parts such as an engine in installing the hydraulic pressure generating apparatus 1 in the vehicle. Consequently, it is easy to ensure the space where to install the hydraulic pressure generating apparatus 1 in the vehicle.

In the hydraulic pressure generating apparatus 1, the reservoir 26 is laid on the upper surface of the base body 10, and the master cylinder 20, the motor cylinder 30, the stroke simulator 40 and the reservoir 26 are configured as the separate units.

Thus, while the embodiment has been described, the invention is not limited to the embodiment but can be altered as required without departing from the spirit and scope thereof.

The solenoid valves 13, 15a, 15b, 15c and the pressure sensors 18a, 18b that are shown in FIG. 2 should be disposed on the side of the right side surface that lies adjacent to the front surface 10b of the main body portion 10a, and there is imposed no limitation on the positional relationship of the solenoid valves 13, 15a, 15b, 15c and the pressure sensors 18a, 18b.

For example, a configuration may be adopted in which at least one of the solenoid valves 13, 15a, 15b, 15c is disposed in an area lying nearer to the upper surface 10d than the axis L1 of the first cylinder bore 21, whereas the remaining solenoid valves are disposed in an area lying nearer to a lower surface 10e than the axis L1. In this configuration, as shown in FIG. 1, the hydraulic pressure lines between the first cylinder bore 21 and the solenoid valves 13, 15a, 15b, 15c can be laid out compact.

The stroke sensor 19, the solenoid valves 13, 15a, 15b, 15c, the pressure sensors 18a, 18b and the control unit 50 may be attached to the left side surface 10g (refer to FIG. 3), the upper surface 10d or the lower surface 10e of the main body portion 10a shown in FIG. 2.

In the first embodiment, while the second cylinder bore 31 and the third cylinder bore 41 are disposed below the first cylinder bore 21 as shown in FIG. 4, the third cylinder bore 41 may be disposed to a side of the first cylinder bore 21. Alternatively, the first cylinder bore 21 may be disposed below the second cylinder bore 31.

In the first embodiment, while the second cylinder bore 31 is opened to the left side surface 10g of the main body portion 10a as shown in FIG. 5, the second cylinder bore 31 should be opened to a side surface of the main body portion 10a that is adjacent to the surface to which the first cylinder bore 21 is opened. For example, a configuration may be adopted in which the second cylinder bore 31 is opened to the right side surface 10h and the motor 34 is attached to the right side surface 10h while the control unit 50 is attached to the left side surface 10g.

In the first embodiment, while the first cylinder bore 21 and the third cylinder bore 41 are opened to the rear surface 10c of the main body portion 10a of the base body 10 as shown in FIG. 4, those cylinder bores may be opened to the front surface 10b of the main body portion 10a. The first cylinder bore 21 and the third cylinder bore 41 may be opened in an opposite direction.

In the first embodiment, while the axis L2 of the second cylinder bore 31 intersects the respective axes L1, L3 of the first cylinder bore 21 and the third cylinder bore 41 at right angles, the axis L2 should intersect the axes L1, L3.

In the first embodiment, while the motor cylinder 30 is made up of the cylinder that utilizes one piston, the motor cylinder may be made up of a tandem-type cylinder that has two pistons.

In the case of the motor cylinder 30 being made up of the cylinder that utilizes one piston, the axial length of the second cylinder bore 31 can be made short. Thus, the motor cylinder 30 can be made compact in the left-to-right direction.

In the first embodiment, the three devices such as the master cylinder 20, the motor cylinder 30 and the stroke simulator 40 are provided as shown in FIG. 1, the two devices of the master cylinder 20 and the motor cylinder 30 may be provided. Only the master cylinder 20 may be provided.

[Second Embodiment]

Next, a hydraulic pressure generating apparatus according to a second embodiment will be described.

Figure 6:
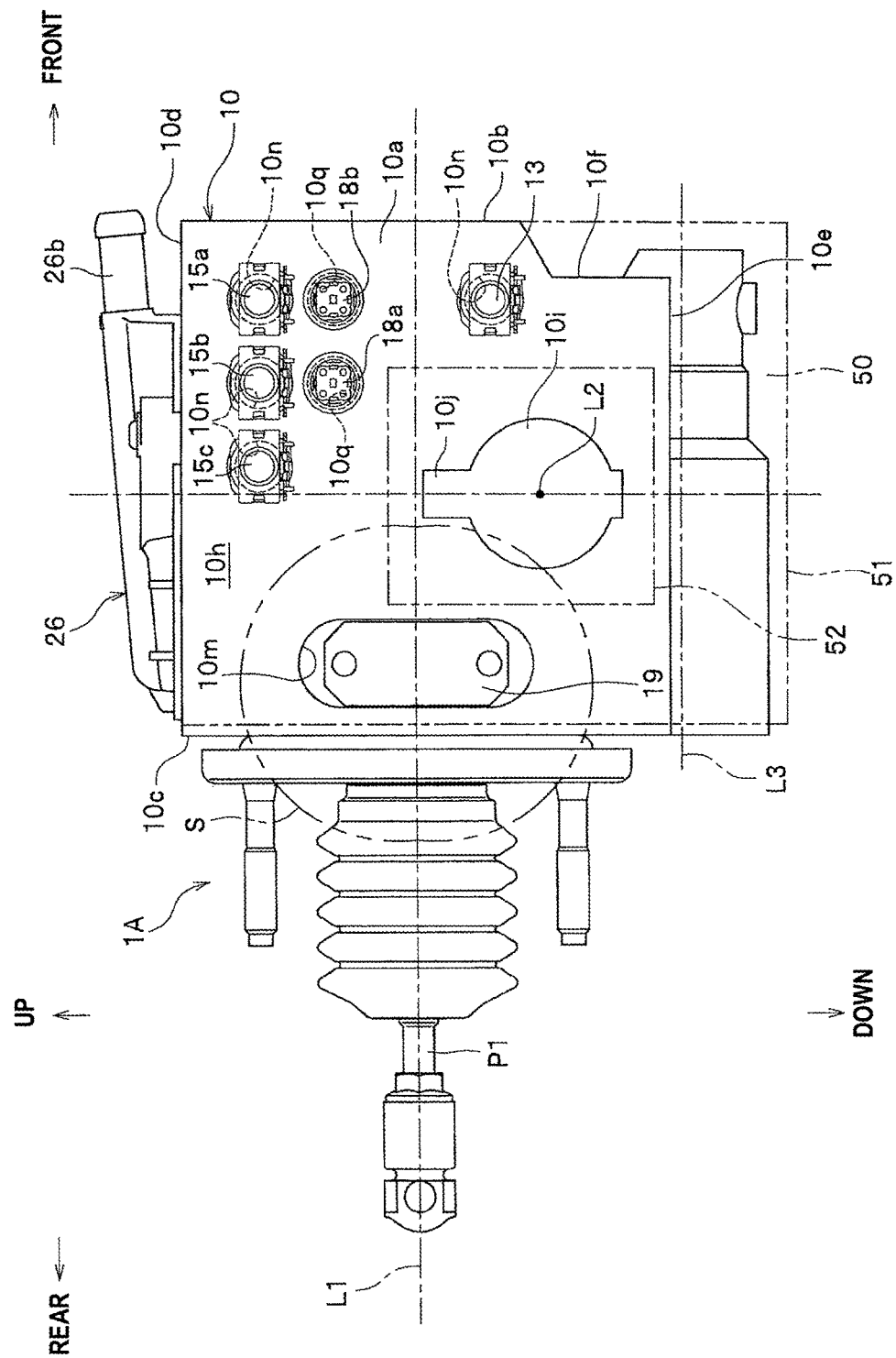
FIG. 6 is a side view showing a hydraulic pressure generating apparatus of a second embodiment.

In a hydraulic generating apparatus 1A of the second embodiment, as shown in FIG. 6, a normally closed solenoid valve 13 is disposed nearer to a lower surface 10e than an axis L1 of a first cylinder bore 21.

In this configuration, as shown in FIG. 1, the normally closed solenoid valve 13 that controls the flow of a brake fluid into a stroke simulator 40 can be laid nearer to a third cylinder bore 41. This can shorten a branch hydraulic pressure line 12 between the normally closed solenoid valve 13 for the stroke simulator 40 and the third cylinder bore 41.

The invention claimed is:

1. A hydraulic pressure generating apparatus comprising:
a base body having hydraulic pressure lines thereinside;
a master cylinder that generates a brake hydraulic pressure by a first piston, the first piston being connected to a brake operator; and
a stroke sensor that detects a position of the brake operator,
wherein a rear surface of the base body faces the brake operator, and a bottomed-cylindrical-shaped first cylinder bore accommodating the first piston is opened to the rear surface of the base body, an input member that is connected to the brake operator being inserted in the first cylinder bore,
wherein a second bottomed cylindrical bore is disposed so as to be spaced apart downwards from the bottomed-cylindrical-shaped first cylinder bore,
wherein the stroke sensor, a plurality of solenoid valves and a control unit are attached to one surface of the base body, and the stroke sensor and the solenoid valves are accommodated within a housing of the control unit, the one surface lying adjacent to the rear surface of the base body,
wherein the stroke sensor is disposed on a side of the one surface that lies adjacent to the rear surface of the base body,
wherein the solenoid valves are disposed on the other side of the one surface that lies adjacent to a front surface of the base body,
wherein an axis L1 of the bottomed-cylindrical-shaped first cylinder bore extends in the front-to-rear direction,
wherein the bottomed-cylindrical-shaped first cylinder bore is opened to an end face of a cylindrical portion that is formed on the rear surface of a main body portion of the base body,
wherein an axis L2 of the second bottomed cylindrical bore extends in the left-to-right direction and crosses the axis L1 of the bottomed-cylindrical-shaped first cylinder bore therebelow vertically,
wherein the stroke sensor is a magnetic sensor that detects a position of a magnet attached to the input member connected to the brake operator by detecting a change in magnetic field,
wherein the second bottomed cylindrical bore is opened to another side surface of the main body portion,
wherein the base body has a bottomed-cylindrical-shaped third cylinder bore accommodating a third piston,
wherein the first cylinder bore and the third cylinder bore communicate with each other through the hydraulic pressure line, and
wherein the solenoid valve capable of cutting off a communication between the first cylinder bore and the third cylinder bore is disposed closer to the third cylinder bore than the axis of the first cylinder bore.

2. The hydraulic pressure generating apparatus of claim 1, further comprising:
a motor cylinder that generates a brake hydraulic pressure by a second piston using a motor as its drive source,
wherein a projecting portion is formed on the one surface of the base body,
wherein the second bottomed cylindrical bore which accommodates the second piston is opened to the other surface opposite to the one surface of the base body, and the motor is attached to the other surface,
wherein the projecting portion is accommodated within the housing, and wherein a bottom portion of the second bottomed cylinder bore is formed within the projecting portion.

3. The hydraulic pressure generating apparatus of claim 2, wherein the stroke sensor is disposed closer to the side lying adjacent to the rear surface than a center of the second bottomed cylinder bore, and
wherein the solenoid valves are disposed closer to the side lying adjacent to the front surface than the center of the second bottomed cylinder bore.

4. The hydraulic pressure generating apparatus of claim 2, wherein the one surface of the base body is a side surface of the base body, and
wherein the solenoid valves are disposed closer to a side of the one surface that lies adjacent to an upper surface of the base body than the center of the second bottomed cylinder bore.

5. The hydraulic pressure generating apparatus of claim 1, wherein at least one of the solenoid valves is disposed in an area lying on one side of an axis of the first cylinder bore, and
wherein the remaining solenoid valves are disposed in an area lying on the other side of the axis of the first cylinder bore.

6. The hydraulic pressure generating apparatus of claim 1, further comprising:
a stroke simulator that imparts a pseudo operating reaction force to the brake operator by the third piston in a biased state.

7. The hydraulic pressure generating apparatus of claim 1, wherein a pressure sensor that detects a brake hydraulic pressure within the hydraulic pressure line is attached to the one surface of the base body, and
wherein the pressure sensor is disposed on the side of the one surface that lies adjacent to the front surface of the base body.

8. The hydraulic pressure generating apparatus of claim 1, wherein a bottom surface of the second bottomed cylindrical bore is disposed within a projecting portion of the main body portion and is accommodated within the housing of the control unit.

9. The hydraulic pressure generating apparatus of claim 8, further comprising:
a third bottomed cylindrical bore disposed so as to be spaced apart downwards from the bottomed-cylindrical-shaped first cylinder bore and the second bottomed cylindrical bore,
wherein the second bottomed cylindrical bore is disposed between the bottomed-cylindrical-shaped first cylinder bore and the third bottomed cylindrical bore,
wherein an axis L3 of the third bottomed cylindrical bore is parallel to the axis L1, and
wherein the third bottomed cylindrical bore is opened to the rear surface of the main body portion.

10. The hydraulic pressure generating apparatus of claim 9, further comprising:
wherein the axis L1 and the axis L3 are projected on a horizontal plane that passes through the axis L2,
wherein the axis L2 intersects the axis L1 and the axis L3 at right angles, and
wherein the axis L2 intersects a vertical straight line that connects an axis position of the bottomed-cylindrical-shaped first cylinder bore to an axis position of the third bottomed cylindrical bore right angles.

11. The hydraulic pressure generating apparatus of claim 10,
wherein the stroke sensor is disposed in an area that lies closer to the rear surface than the axis L2 on the same side surface of the main body portion, and
wherein the solenoid valves are disposed closer to the front surface than a plane that passes through the axis L2 while being normal to the axis L1.

12. The hydraulic pressure generating apparatus of claim 10,
wherein the stroke sensor is spaced apart in the front-to-rear direction from the solenoid valves so that the solenoid valves are disposed outside an area surrounding a circumference of the stroke sensor.

13. The hydraulic pressure generating apparatus of claim 10,
wherein the solenoid valves are disposed nearer to an upper surface than a plane that passes through the axis L2 on the same side surface of the main body portion.

14. The hydraulic pressure generating apparatus of claim 10,
wherein the solenoid valves are disposed nearer to an upper surface than a plane that passes through the axis L1 while being parallel to the axis L2.

15. The hydraulic pressure generating apparatus of claim 10,
wherein the stroke sensor, the solenoid valves and the control unit are attached to a left side surface, an upper surface or a lower surface of the main body portion.

16. The hydraulic pressure generating apparatus of claim 10,
wherein a normally closed solenoid valve is disposed nearer to a lower surface than the axis L1.

17. The hydraulic pressure generating apparatus of claim 1, further comprising:
a third bottomed cylindrical bore disposed so as to be spaced apart downwards from the bottomed-cylindrical-shaped first cylinder bore and the second bottomed cylindrical bore,
wherein the second bottomed cylindrical bore is disposed between the bottomed-cylindrical-shaped first cylinder bore and the third bottomed cylindrical bore,
wherein an axis L3 of the third bottomed cylindrical bore is parallel to the axis L1 and
wherein the third bottomed cylindrical bore is opened to the rear surface of the main body portion.

18. A hydraulic pressure generating apparatus comprising:
a base body having hydraulic pressure lines thereinside;
a master cylinder that generates a brake hydraulic pressure by a first piston, the first piston being connected to a brake operator; and
a stroke sensor that detects a position of the brake operator,
wherein a rear surface of the base body faces the brake operator, and a bottomed-cylindrical-shaped first cylinder bore accommodating the first piston is opened to the rear surface of the base body, an input member that is connected to the brake operator being inserted in the first cylinder bore,
wherein the stroke sensor, a plurality of solenoid valves and a control unit are attached to one surface of the base body, and the stroke sensor and the solenoid valves are accommodated within a housing of the control unit, the one surface lying adjacent to the rear surface of the base body,
wherein the stroke sensor is disposed on a side of the one surface that lies adjacent to the rear surface of the base body, wherein the solenoid valves are disposed on the other side of the one surface that lies adjacent to a front surface of the base body; and further comprising:

a cylindrical projecting portion provided on a side surface of a main body portion of the base body so as to project therefrom; and an elongated projection formed at an upper end portion of a circumferential wall portion of the projecting portion, wherein the elongated projection extends in an axial direction of the projecting portion, wherein the projecting portion is provided at a lower portion below a center of the side surface in relation to a front-to-rear direction of the main body portion, wherein part of the main body portion is removed at a lower portion of a front surface to form a clearance portion, and wherein the clearance portion is a portion where the lower portion of the front surface of the main body portion is depressed further rearwards than an upper portion of the front surface.

19. The hydraulic pressure generating apparatus of claim 1,
wherein the stroke sensor, the solenoid valves, and the control unit are attached to a same side surface of a main body portion of the base body.

20. A hydraulic pressure generating apparatus comprising:
a base body having hydraulic pressure lines thereinside;
a master cylinder that generates a brake hydraulic pressure by a first piston, the first piston being connected to a brake operator; and
a stroke sensor that detects a position of the brake operator,
wherein a rear surface of the base body faces the brake operator, and a bottomed-cylindrical-shaped first cylinder bore accommodating the first piston is opened to the rear surface of the base body, an input member that is connected to the brake operator being inserted in the first cylinder bore,
wherein a second bottomed cylindrical bore is disposed so as to be spaced apart downwards from the bottomed-cylindrical-shaped first cylinder bore,
wherein the stroke sensor, a plurality of solenoid valves and a control unit are attached to one surface of the base body, and the stroke sensor and the solenoid valves are accommodated within a housing of the control unit, the one surface lying adjacent to the rear surface of the base body,
wherein the stroke sensor is disposed on a side of the one surface that lies adjacent to the rear surface of the base body,
wherein the solenoid valves are disposed on the other side of the one surface that lies adjacent to a front surface of the base body,
wherein an axis L1 of the bottomed-cylindrical-shaped first cylinder bore extends in the front-to-rear direction,
wherein the bottomed-cylindrical-shaped first cylinder bore is opened to an end face of a cylindrical portion that is formed on the rear surface of a main body portion of the base body,
wherein an axis L2 of the second bottomed cylindrical bore extends in the left-to-right direction and crosses the axis L1 of the bottomed-cylindrical-shaped first cylinder bore therebelow vertically,
wherein the second bottomed cylindrical bore is opened to another side surface of the main body portion,
wherein a bottom surface of the second bottomed cylindrical bore is disposed within a projecting portion of the main body portion and is accommodated within the housing of the control unit, and further comprising:
a third bottomed cylindrical bore disposed so as to be spaced apart downwards from the bottomed-cylindrical-shaped first cylinder bore and the second bottomed cylindrical bore,
wherein the second bottomed cylindrical bore is disposed between the bottomed-cylindrical-shaped first cylinder bore and the third bottomed cylindrical bore,
wherein an axis L3 of the third bottomed cylindrical bore is parallel to the axis L1,
wherein the third bottomed cylindrical bore is opened to the rear surface of the main body portion,
wherein the axis L1 and the axis L3 are projected on a horizontal plane that passes through the axis L2,
wherein the axis L2 intersects the axis L1 and the axis L3 at right angles,
wherein the axis L2 intersects a vertical straight line that connects an axis position of the bottomed-cylindrical-shaped first cylinder bore to an axis position of the third bottomed cylindrical bore right angles, and
wherein a projecting portion of the main body portion is disposed lower than the axis L1 on a first side surface of the main body portion, and a clearance portion is formed at the lower portion of the front surface of the main body portion such that the solenoid valves and the pressure sensor is disposed upper than the axis L1 on the first side surface of the main body portion.

* * * * *